March 7, 1967
E. H. CONDON ET AL
3,307,992
PROCESS OF MANUFACTURING A WEB PRODUCT
USING AN ADHESIVE PLASTISOL
Filed Nov. 13, 1961
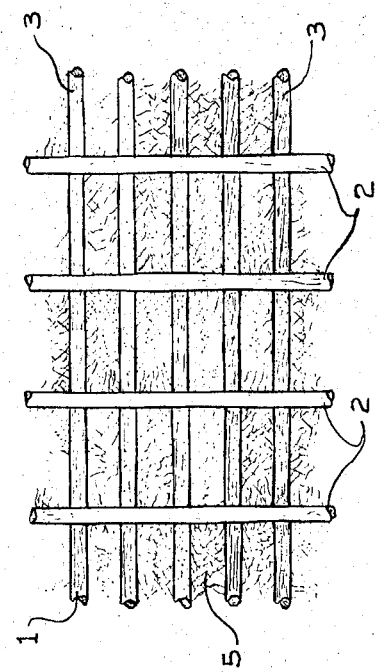
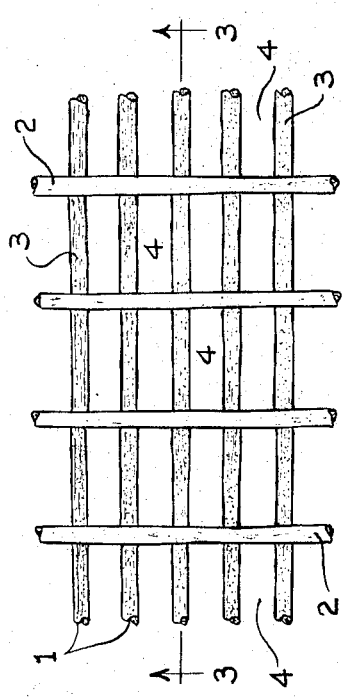
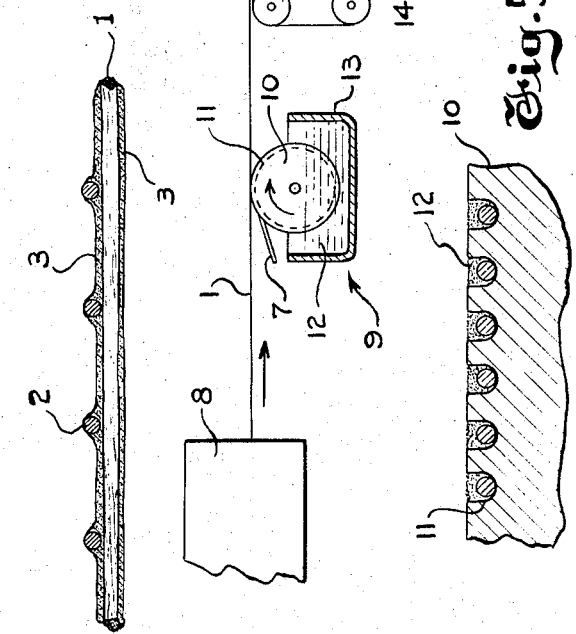

3,307,992
PROCESS OF MANUFACTURING A WEB PRODUCT USING AN ADHESIVE PLASTISOL
Eugene H. Condon and Thomas A. Hadley, both of Neenah, Wis., assignors to Kimberly-Clark Corporation, Neenah, Wis., a corporation of Delaware
Filed Nov. 13, 1961, Ser. No. 151,804
1 Claim. (Cl. 156—181)

This invention relates to improved web products which incorporate a bonding agent and to a method of producing the same. More specifically, the invention relates to nonwoven scrims which are characterized by softness, flexibility, water insensitivity, and heat stability sufficient to render the product useful as wrappers for sanitary napkins, disposable towels, hospital and surgical items, and the like.

Various materials have been used as bonding agents in the production of web products. These have included organic solutions, organosols, and plastisols. The organic solutions, of course, include an organic solvent; likewise, organosols include, with a thermoplastic resinous material, an organic solvent plus a plasticizer; plastisols include, with thermoplastic resinous material, a plasticizer of low volatility in which the resin in solid form is dispersed, the plasticizer being relatively insoluble in the resin at temperatures below the fusing point of the resin but soluble in the resin when the resin is fused. The organic solvents, when employed, contribute to tackiness in the material before fusion takes place, whereas the plastisol lacks a high degree of adhesiveness. The solution and organosols, however, require that the solvent be evaporated off necessitating expensive recovery equipment or high solvent loss. Further, very considerable safety precautions are attendant solvent use.

Additionally, for some purposes, particularly where sterilization of a product must be effected, a relatively high molecular weight resin is required in order that it will be able to withstand sterilizing temperature. Such high molecular weight resins require for their solution or dispersion relatively large quantities of organic solvent. Thus, in such instances the problems of solvent evaporation, safety, and capital cost for equipment are relatively great.

A high degree of tackiness is desired in a composition which is to be applied as a bonding agent to webs such as nonwoven scrims, and this requirement is more serious as the speeds of the machines on which the webs are formed become greater. In the formation of such webs, tackiness in the final product must be completely eliminated in order to avoid undesired adherence of portions of wrappers, for example. In solvent systems tackiness customarily disappears with the evaporating solvent; in plastisol systems the tackiness is insufficient generally to contribute to high speed operation.

The tackiness of the adhesive composition is particularly important in the formation of nonwoven scrim materials as the adhesive is then the sole factor retaining cross-laid threads on longitudinally extending threads both during machine operation and after the product is formed. Once laid across the longitudinally extending threads or filaments in oriented fashion, the adhesive character of the composition must be such as to inhibit relative movement between the longitudinal and cross-laid threads. Volatile solvent systems may be formulated to have the required adhesive characteristics but are subject to the foregoing noted defects; additionally, solvent systems for cross-laid threads produce for many purposes a product which is relatively stiff, weak and harsh.

In addition to the required adhesive characteristics, the composition must be sufficiently free-flowing in the formative state of the web that it tends to coat the longitudinal threads to which it is usually directly applied. Coating of these threads is necessary, and an adhesive character in the coating is required for otherwise the fillers might be applied in machine operation to areas bare of adhesive composition, permitting relative movement of the cross-laid threads on the longitudinally extending threads.

This invention contemplates the provision of a plastisol type composition so modified as to its adhesive characteristics that it is capable of developing a high degree of tackiness in the early stages of a production process when applied, for example, to longitudinally extending threads. Upon setting of the composition after appropriate application of temperature, the adhesive character disappears and the component which induces adhesiveness in the plastisol is occlud within the cured plasticol so as to have no deleterious effect on the final character of the scrim product. In fact, the scrim product of the invention is improved particularly with respect to that achieved by organic solvent systems in the matter of flexibility, softness, and stability.

The invention further contemplates the provision of a novel process for the application of an adhesive plastisol compound to a nonwoven web material in the form of a scrim having a fiber appliqué. The invention also contemplates the provision of a process for the production of a nonwoven scrim material, and which process may be carried out at relatively high machine speeds despite the high shear action which results from passage of the longitudinal threads through the adhesive composition.

The invention also contemplates a process for forming a nonwoven scrim product at relatively high speeds and which scrim is resistant to heat sufficient to permit the use of the product in items requiring sterilization temperatures.

Essentially, in the practice of the invention a plasticizer of a plastisol or an additional plasticizer is employed as a solvent for a tackifying agent. This plasticizer, whether it is the plasticizer of the plastisol itself or an additional plasticizer, becomes a part of the final product and tends to impart desirable characteristics to the material, particularly flexibility. The tackifying agent, when separately dissolved, is dissolved in a plasticizer which is compatible with the plasticizer and resin of the plastisol. The plasticizer serves a plural purpose as it carries the tackifying agent in such manner that tackiness is available when required, but the tackifying agent is inert in the set condition of the plastisol.

Most suitably, the tackifying agent is dissolved in the plasticizer separately from the plastisol itself. This reduces the tendency of the plastisol to gel. Such procedure aids the attainment of a true solution of the tackifying agent; this state is necessary to assure of the appropriate development of tack properties for machine operation and to offset disruptive forces tending to occur during setting of a plastisol. Usually it is preferable that the tackifying agent be in solution at room temperature, as such provides for optimum control; however, the tackifying agent and plasticizer may be of such nature that the solution required is achieved under conditions of moderate temperature. In practice, the most desirable tackifying agents develop tack just prior to the application of the cross-laid threads but form plastisol systems which are free flowing for application to the longitudinal threads; the development of the tackiness occurs with change, that is, increase in temperature and the peak of tackiness is attained at a temperature below 350° F.

Tackifying agents suitable for the practice of the invention include: rosin esters such as hydrogenated glycerine esters of rosin, pentaerythritol esters of rosin, polyvinyl acetate, or polyvinyl chloride copolymers. Suitable plasticizers for the solution of the tackifying agent selected so that they do not gel the plastisol include: the phthalates such as dibenzyl, phenyl benzyl, butyl benzyl, dibutyl, diphenyl, di-2-ethyl-hexyl, dicapryl, didecyl; the sebacates such as di-2-ethyl-hexyl, and dibutyl; the adipates such as dimethyl, dibenzyl, dibutoxy ethyl, dioctyl, diisodecyl; the phosphates such as dibutyl phenyl, phenyl dicresyl, isoctyl, diphenyl, octyl cresyl, and di-2-ethyl hexyl. The plasticizers selected for high speed machine operation preferably provide an adhesive plastisol of relatively low viscosity, of rapidity of fusion, of low migration and of minimum volatility.

The threads employed for either the longitudinal or the cross-laid fibers may be natural or synthetic, and for the particular purposes of nonwoven scrim are preferably of nylon or rayon. The term threads as employed herein will be understood to include yarns, continuous length fibers, monofilaments and the like.

The invention will be more fully understood by reference to the following detailed description and accompanying drawings wherein:

FIG. 1 is a schematic illustration on an enlarged scale of a nonwoven scrim product in accordance with the invention;

FIG. 2 is an illustration similar to that of FIG. 1 but with an appliqué carried by the serim of FIG. 1;

FIG. 3 is a sectional view taken on line 3—3 of FIG. 1;

FIG. 4 is a view of apparatus useful in the practice of the invention; and

FIG. 5 is a fragmentary view of a portion of the structure of FIG. 4.

Referring to the drawings more in detail, the numeral 1 in FIG. 1 designates a plurality of longitudinally extending parallel arranged nylon threads. Numeral 2 indicates cross-laid nylon threads which extend in parallel relation across the threads 1 on one side thereof to form therewith an open network or web. Commonly, in the practice of the invention these threads are 40 denier but may be in the range of 15 to 3200 denier.

It is essential to the attainment of a suitable product that the direction of lay of the cross-laid threads 2 relative to the longitudinal threads 1 be constant and that random orientation of either the longitudinal or the cross-laid threads with respect to each other does not occur. Accordingly, the threads cross-laid in proper relative position must be so held that the relationship is not disturbed by subsequent processing.

The threads are retained in their cross-laid relationship by the bonding agent in the form of a set adhesive plastisol designated at 3. This bonding agent forms a very fine thin film over the threads. In the present instance of the longitudinally extending threads the film receives the cross-laid threads and at the time of such receipt the film is highly tacky and somewhat fluid but preferably only sufficiently so that a cross-laid thread may intimately contact the film on the longitudinally extending thread, the threads (FIG. 3) being partially embedded in the adhesive plastisol composition. Suitably, the adhesive plastisol for yarns of about 40 denier is applied to the scrim to the extent of between about 2 to 4 grams per square yard of scrim.

The bonded cross-laid threads in the manufacture of wrappers for sanitary napkins, for example, is subjected to the application of fine fibers which bond to the web and extend across the openings 4 thereof. Such an appliqué is designated at 5 in FIG. 2. The appliqué itself may have a weight of 2 to 9 grams per square yard in a finished product having 40 denier nylon yarn and a total weight of 8 to 18 grams per square yard with the adhesive weight in the ranges noted.

The webs of FIGS. 1 and 2 are suitably produced with equipment illustrated generally at 6 in FIG. 4. Such equipment for production purposes must operate at reasonable speeds and perform a plurality of diverse functions.

Referring more specifically to FIG. 4, the numeral 8 designates a source of supply of threads 1. Such threads are drawn from the source and may be carded or the like as they proceed toward a supply of adhesive indicated generally at 9.

The adhesive plastisol supply 9 includes an adhesive applicator roll 10 having rounded bottom V grooves 11 which receive and guide the threads; for specific application guides may be employed between the roll and source 8. Roll 10 rotates in a pond of adhesive coating composition 12, the pond being retained by the trough 13. The applicator roll is contacted by a conventional knife blade 7 and is suitably driven in rotation in the direction indicated by the arrows at a slow speed relative to the longitudinal speed of the threads 1. The applicator roll V grooves 11 (FIG. 5) are flooded with the adhesive plastisol and, accordingly, the threads 1, as shown, are substantially submerged in adhesive on the applicator roll 10; knife blade 7 scrapes the roll so as to provide the filled V grooves.

The adhesive composition 12 is flowable and coats the threads 1 therearound thoroughly. In general, it is only desired that this adhesive plastisol be metered to the longitudinal threads in a generally continuous pattern.

From the applicator roll 10 the threads 1 pass in their parallel relation to a conveyor belt 14 carried on rollers 15 and driven by any suitable means not shown. This conveyor belt suitably is a silicone rubber and operates at an elevated temperature. Thus, the threads 1 with the adhesive 12 thereon are subjected to heat as they are received on the belt 14. This heat should be sufficient to activate and increase the adhesive nature of the composition 12 in the preferred practice of this invention.

The belt 14 is itself suitably heated by infrared heating elements designated at 16 and mounted in hot box 19. Thus, since the belt travels in the direction indicated by the arrows, a temperature gradient exists around the belt, the temperature being greater at the outlet of box 19.

The cross-laid threads are directed to the longitudinally extending threads on the conveyor belt by means of the device indicated at 18. This unit may take any one of several forms, one suitable arrangement being illustrated and described in U. S. Patent No. 2,841,202 issued July 1, 1958. As illustrated in such patent, the logitudinal threads pass to the apparatus, which lay down the cross-laid threads under tension, the cross-laid threads being cut from the scrim as the threads proceed in the practice of this invention toward hot box 19. The belt 14 in this apparatus follows a helical path as described in the above-mentioned patent; on FIG. 4 the belt traverse is only generally designated.

As the traveling cross-laid web leaves the device 18, it enters hot box 19 which operates at a higher temperature than the belt and serves to further set the plastisol. The material is at this stage, however, still quite tacky, but having lost some tack, is readily removable from the belt, the belt being at its highest temperature at the box 19 outlet.

The scrim, that is, the combination of longitudinal and cross-laid threads retained together by the adhesive plastisol as it leaves the belt, passes to a dispenser 20 of fine fibers which may be natural or synthetic; these are applied to the traveling scrim by an air blast, gravity feed or a similar mechanism. At this stage the adhesive is still sufficiently soft to retain the fine fibers which tend to lightly film the openings 4 of the scrim. The fibers may be applied to either or both sides of the scrim. In some instances a layer of crepe wadding or other thin sheet material may be applied to the traveling scrim.

The self-supported scrim with the fiber appliqué thereon passes between the calender rolls 22–24 and is compressed or ironed thereby also fusing the resin. Calender roll 22 is not normally heated but attains a temperature of about 225°–300° F. When calender roll 24 is heated to a temperature of about 300°–400° F., at least one roll is directly heated to provide for curing. From the calender the warm material is directed to a windup roll 26 over a guide roll 28. Between the guide roll 28 and the windup roll 26 the material is subjected to air cooling by air blasts from nozzles designated at 30. The air blasts serve to complete the hardening of the resinous material, which is then readily wound into the roll indicated at 32. The material is suitably drawn and wound by any conventional mechanism.

In the practice of the invention the nature of the composition 12 of utmost importance. The tack of the composition must be well developed at the time that the adhesive plastisol bearing longitudinal threads pass the device 18; the tack must be completely eliminated at windup 26. The following are exemplary compositions useful in the trough 13 for application to the threads. However, it is to be noted that one effect of the adhesive plastisol is to materially improve resistance to wet rub in the finished product. The fibers of the appliqué do not scuff off the scrim when rubbed with a moist sponge, for example.

*Example 1*

One hundred (100) parts by weight of a dispersion type polyvinyl chloride resin of a small particle size suitable for plastisol formulation, such as B. F. Goodrich's Geon 121, is employed. This 100 parts of polyvinyl chloride resin is dispersed in about 60 parts by weight of diisodecyl phthalate. This forms a conventional plastisol. Separately, 25 parts by weight of a pentaerythritol ester of rosin such as Pentalyn H, a product of the Hercules Powder Company, is dissolved in 25 parts by weight of diisodecyl phthalate by adding the rosin ester to the liquid plasticizer and heating until solution occurs. This rosin ester solution is then cooled to room temperature and thereafter is mixed with the dispersion of the polyvinyl chloride resin with mild agitation. The viscosity of the mixture is suitably between about 1500 to 2000 centipoises at 70° F. and the mixture is flowable at room temperature. This composition has a creamy appearance. It is coated onto the material by the applicator roll. The material of this example was 9 strands per inch of 40 denier nylon; the weight pickup of the composition was about 3.5 grams per square yard of finished product. As already noted, the temperature of the adhesive on the strands is first raised, in this instance to about 250° F., by contact with the silicone belt 14. This initial temperature rise materially develops the tackiness of the composition. There is, however, substantially no evaporation of the composition. It is to be noted that the composition, that is, the adhesive plastisol, before the application of temperature is not substantially tacky and is rather somewhat in the nature of an oil as to physical appearance and feel. After the application of the initial temperature, a considerable tack has developed, and it is this feature which permits retention of the cross-laid threads on the longitudinally extending threads at machine speeds to produce the scrim.

In the cross direction 5 strands per inch of 100 denier rayon were applied. The formed scrim is stripped from the belt prior to the application of the fine fibers. These fine fibers are applied to the extent of about 5 grams per square yard to yield a finished product having a square yard weight of about 12 grams.

The final fusion and cure of the plastisol is finished on the calender drums at about 350° F. The air flow through the material as it leaves the calender not only serves to cool the resin but, in addition, effectively inhibits blocking of the wound product.

Under the conditions set forth hereinbefore, the ester of rosin might be employed to the extent of as little as 5 parts by weight while the proportions of other components remained the same. Below about 5 parts or, in any event, too little of the tackifying agent, fails to adequately develops tackifying power regardless of the time of heating on the belt. Above about 40 parts by weight of the rosin ester, with the proportions of other components remaining the same, the tackifying agent results in a stiffer product which is useful for some purposes but does not exhibit optimum flexibility for wrappings; however, in addition, in this higher range the tackifying agent also tends to induce residual tack in the product which may lead to blocking.

In the foregoing example the plasticizer diisodecyl phthalate utilized to disperse the 100 parts by weight of polyvinyl chloride resin might be present to the extent of as little as 30 parts by weight. Under this condition the product tends to be more stiff. Suitably, also, the plasticizer for the polyvinyl chloride resin could be as much as 100 parts by weight, which tends to result in a softer product as well as to inhibit the development of residual tack even at the higher proportions of rosin ester.

Under the foregoing specific conditions a machine speed of 500 f.p.m. is readily attainable.

*Example 2*

One hundred (100) parts by weight of a dispersion type polyvinyl chloride copolymer containing at least 95% polyvinyl chloride is employed. The remaining 5% suitably is polyvinyl acetate or other vinyl material. One useful commercial product for the purpose is that sold by the B. F. Goodrich Company under the designation Geon 135. This 100 parts of copolymer is dispersed in about 80 parts by weight of butyl benzyl phthalate. Such plastisol tends to increase in viscosity with time of standing; preferably, it should be applied shortly after formation at a viscosity of about 1500–2000 centipoises. Separately, 10 parts by weight of a hydrogenated glycerine ester of rosin such as Staybelite Ester #5, manufactured by Hercules Powder Company of Wilmington, Delaware, are dissolved in 10 parts of butyl benzyl phthalate. The Geon 135 in the phthalate has a creamy white appearance. The solution of the rosin ester in the plasticizer is then added to the resin dispersion at room temperature with slight agitation to avoid any material rise in the temperature of the combination. This material serves the same purpose as the material of Example 1 except that a lower belt temperature of about 200° F. may be employed while the cure temperature at the calender rolls is about 270° F.

*Example 3*

One hundred (100) parts by weight of a dispersion type polyvinyl chloride resin of high molecular weight similar to that employed in Example 1 are dispersed in about 90 parts of dicapryl phthalates; this plasticizer may readily vary from 60–120 parts by weight. Three (3) parts by weight of a polyvinyl acetate such as is used in organic coating applications are dissolved in 20 parts by weight of dioctyl phthalate. The quantity of this resin relative to the dioctyl phthalate should be such that at normal temperature the viscosity of the solution will fall within the range of 300 to 10,000 centipoises for adequate handling. Preferably, the viscosity is maintained in the range of 1500–2000 centipoises at 70° F. for application. Alternatively, one might use 3 parts of a vinyl acetate-vinyl chloride copolymer such as B. F. Goodrich's Geon 443 or Union Carbide's VAGH. The solution in the dioctyl phthalate is blended with the dispersion of polyvinyl chloride in the dicapryl phthalate with slight agitation and is employed as the adhesive plastisol 12. The temperature on the belt at entry of the threads in this instance may be, as in Example 1, about 280° F., while the final cure temperature is 350° F. Also, the quantity of tackifier dissolved in the dioctyl phthalate may be between about one (1) and 15 parts by weight rather than the indicated three (3) parts by weight as long as the viscosity is such as to permit free flow. Modifying agents such as polyethylene glycol may be added in the systems of this invention to lower viscosity as required to achieve the free flow condition.

*Example 4*

Particularly for the products wherein the scrim is enclosed, as in reinforced paper products, the following procedure is desirable for the development of maximum holding power. One hundred (100) parts by weight of a dispersion type polyvinyl chloride-polyvinyl acetate copolymer containing at least about 95% polyvinyl chloride, such as B. F. Goodrich's Geon 135, is dispersed in 30 parts by weight of dioctyl adipate. Separately, 10 parts by weight of cumarone-indene polymer is dissolved in 20 parts by weight of epoxy type plasticizer such as di-N-decylepoxyhexahydrophthalate. Also, 20 parts by weight of a polymeric polyester such as that obtained from the polymerization of adipic acid and 2-ethyl-1,3-hexanediol to provide a product having a molecular weight of 2,000 to 8,000 is dissolved with the cumarone resin. The described dispersion and solution are blended together and utilized as the composition 12. In this instance the belt temperature at thread entry to the bolt is about 250° F., while the final cure temperature is about 310° F.

The blend of plasticizers for the solution of the resin provides good heat stability due to the presence of the epoxy and good nonmigration properties due to the polyesters's presence.

The scrim product produced by the foregoing procedures is quite soft and flexible and is particularly superior to the product derived from organic solvent systems. Additionally, the tackifying agent, due to its occlusion in the plastisol, has no apparent effect on scrim stiffness.

It is believed to be a feature of this invention that complete solvation of the tackifying agent is achieved. For this reason, it is preferable to dissolve the tackifying agent in the plasticizer separately from the plastisol. Also, it is desirable that the plastisol and the solution of the tackifying agent be cool when mixed to avoid early development of material tackiness and gelling.

Complete solvation of the tackifying agent is reached in the plasticizer; when the tackifying agent is directly added to the plastisol, even with the plasticizer in excess, complete solution of the agent is more difficult to achieve. Further viscosity considerations favor separate preparation of the plastisol and tackifying agent solution.

It will be understood that this invention is susceptible to modification in order to adapt to different usages and conditions and, accordingly, it is desired to comprehend such modifications within the invention as may fall within the scope of the appended claim.

What is claimed is:

In a process of forming a web product in which process a first set of longitudinally moving laterally spaced threads has applied and adhered thereto a second set of spaced threads extending transversely to the first set, the steps of:

(a) forming a liquid adhesive plastisol by first dispersing a polyvinyl resin selected from the group of resins consisting of polyvinyl chloride and polyvinyl chloride-polyvinyl acetate copolymers containing at least 95% polyvinyl chloride by weight in a plasticizer and then admixing with the so dispersed resin a true solution of a rosin ester in a plasticizer, said rosin ester being selected from the group consisting of a pentaerythritol ester of rosin and a hydrogenated glycerine ester of rosin, the said rosin ester being present to the extent of between about 5 and 40 parts by weight per 100 parts of the said polyvinyl resin and the said plasticizer which dissolves the rosin ester being compatible with the polyvinyl resin-plasticizer dispersion;

(b) prior to the application of said second set of threads coating the longitudinally moving threads with the liquid adhesive plastisol;

(c) heating the said coated threads to a temperature of at least 200° F. and below the fusion point of the said polyvinyl resin as the threads move to a zone of application of the transverse threads to materially increase tackiness in the coating and to initiate setting of the coating but without any substantial fusing of the polyvinyl resin;

(d) applying the second set of threads transversely to the longitudinally moving threads while the coating is tacky and substantially unset to partially embed the second set of threads in the tacky coating and to provide an open web;

(e) continuing heating as the said second set of threads is applied and as the web formed by the sets of threads moves longitudinally to further set the coating and decrease the tackiness of the coating;

(f) thereafter further embedding the transverse threads in the coating by pressing the web while heating to a temperature of between about 270° F. and 350° F. and at least sufficient to effect fusion of the polyvinyl resin and to cause occlusion of the tackifying agent; and (g) thereafter cooling the web to harden the coating.

References Cited by the Examiner

UNITED STATES PATENTS 2,900,980   8/1959   Harwood _____ 154—46
3,051,995   9/1962   Ferrell et al. _____ __260—34.2

OTHER REFERENCES

A New Technique in Coatings—Vinylite Resins Dispersions, by Powell and Quarles, pp. 696–702, Official Digest No. 262, December 1946.

ALEXANDER WYMAN, *Primary Examiner.*

EARL M. BERGERT, JACOB H. STEINBERG,
*Examiners.*

R. J. CARLSON, G. D. MORRIS, *Assistant Examiners.*